Dec. 13, 1949        C. E. ADAMS        2,491,355

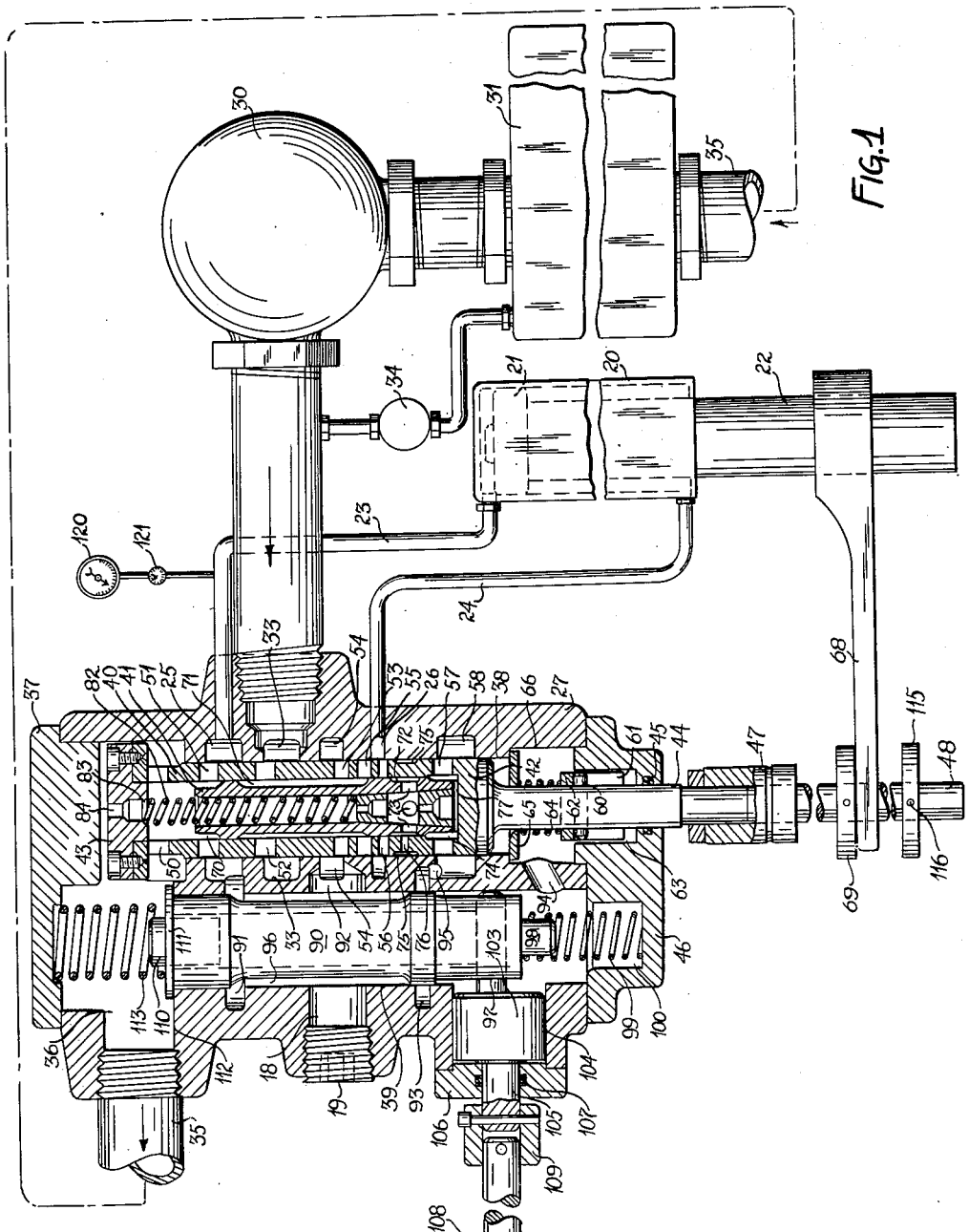

HYDRAULIC VALVE CONTROL MECHANISM

Filed April 19, 1945        5 Sheets-Sheet 2

INVENTOR.
CECIL E. ADAMS
BY
Kuris Hudson Boughton & Williams
ATTORNEYS

Dec. 13, 1949    C. E. ADAMS    2,491,355
HYDRAULIC VALVE CONTROL MECHANISM
Filed April 19, 1945    5 Sheets-Sheet 3

INVENTOR
CECIL E. ADAMS
Kwis Hudson, Boughton & Williams
ATTORNEYS

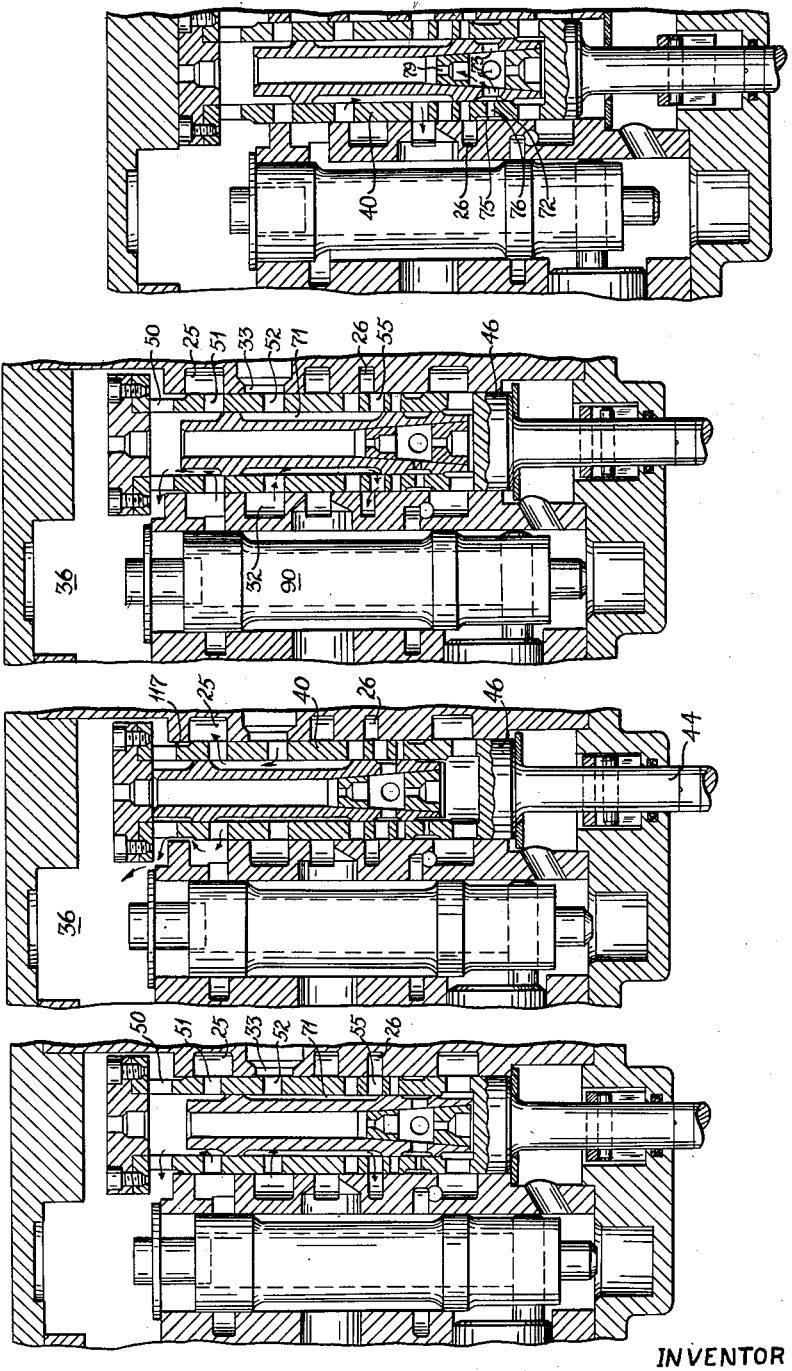

Dec. 13, 1949  C. E. ADAMS  2,491,355
HYDRAULIC VALVE CONTROL MECHANISM
Filed April 19, 1945  5 Sheets-Sheet 5

INVENTOR
CECIL E. ADAMS
Kwis Hudson Baughton & Williams
ATTORNEYS

Patented Dec. 13, 1949

2,491,355

UNITED STATES PATENT OFFICE 2,491,355

HYDRAULIC VALVE CONTROL MECHANISM

Cecil E. Adams, Columbus, Ohio, assignor to The Denison Engineering Company, Columbus, Ohio, a corporation of Ohio Application April 19, 1945, Serial No. 589,163

23 Claims. (Cl. 121—38)

1

This invention relates to improvements in hydraulic control mechanism, particularly means for controlling the operation of hydraulic rams and other reciprocating fluid motors.

One of the objects of the invention is the provision of a compact control mechanism which shall be capable of a variety of results, including continuous reciprocation of a fluid motor, single cycle operation of such motor, continuing application of pressure at the will of the operator, and interruption of the power stroke instantaneously at any point of its travel.

Another object is the accomplishment of all of these results by fluid operated control mechanism mounted in a single housing and requiring a minimum number of outside connections.

Another object is the provision of valve mechanism embodying a light weight shuttle capable of very rapid movement and embodying removable and replaceable constrictions whereby the rate of flow of the operating liquid may be varied to control the speed of reversal of the valve mechanism.

Another object is the provision of reversing means at the bottom of the ram stroke effective either by the engagement of the ram with the work or by the attainment of a measured down stroke, more particularly where the reversal is dependent upon the lowering of back pressure attendant either upon engagement of the ram with the work or upon automatic operation of a valve element when the ram descends to a predetermined point.

Other objects and features of novelty will appear as I proceed with the description of that embodiment of the invention which, for the purposes of the present application, I have illustrated in the accompanying drawings, in which Fig. 1 is a diagrammatic illustration of a control system for a hydraulic ram, the valve mechanism, shown principally in vertical section, including an automatic valve and a manual valve.

Figure 4:
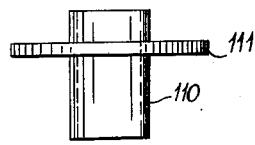
Fig. 4 is an elevational detail view of another spring abutment.
Figure 3:
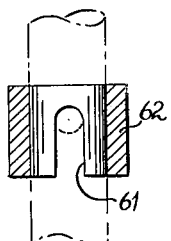
Fig. 3 is a vertical sectional detail view of a spring abutment which may be employed in connection with the invention.

The present invention in some of its aspects is an improvement over my copending applications Serial Numbers 545,700 and 545,701, filed July 19, 1944, now Patents No. 2,464,283 and No. 2,470,086, respectively.

In Fig. 1 I have indicated diagrammatically at 20 a power cylinder in which there is a piston 21 at the upper end of a ram 22, such as the ram of a hydraulic press. The upper and lower ends of cylinder 20 are connnected by tubular conductors 23 and 24 with annular cavities 25 and 26 respectively in a valve housing 27, each of these cavities being adapted to be connected alternatively with live and exhaust fluid conductors by means of the valve mechanism to be described.

A pump indicated at 30, runs continuously during the normal operation of the system, taking fluid from a tank 31 and forcing it through a conductor 32 into an annular cavity 33 in the housing. 34 represents an adjustable relief valve which may be set to spill fluid back into the tank 31 at any predetermined pressure. Exhaust fluid returned to the valve mechanism through one or the other of the conductors 23 and 24 emerges from the valve mechanism through an exhaust connection 35, by means of which it is returned to tank 31.

The housing 27 at its upper end is formed with a compartment 36 from which the exhaust conductor 35 extends. This compartment is closed by an upper end plate 37. Communicating with it are two vertical cylindrical valve chambers 38 and 39 for the automatic and manual valves respectively. I will describe first the automatic valve mechanism which consists of two principal parts, namely a sleeve valve 40 and a shuttle valve 41. Both of these elements are freely slidable with respect to each other and with respect to the internal wall of the valve chamber 38.

Sleeve valve 40 has an integral lower end wall 42, and is closed at its upper end by a removable cap 43. Extending downwardly from the wall 42 there is a stem 44 running through a suitable packing 45 in a bottom end plate 46 and connected by means of a union 47 with a shipper rod 48.

Sleeve valve 40 has a set of ports 50, two or more in number and at the same level, which are in communication with compartment 36 in all positions of the sleeve. It has a set of ports 51 which are always in communication with annular cavity 25 and a set of ports 52 that are always in communication with the annular cavity 33, which is the receiving cavity for live pressure fluid.

In the position of the sleeve illustrated in Fig. 1, which is the uppermost of three different positions, another set of ports 53 communicates with an annular cavity 54 surrounding the chamber 38. These latter ports are out of register with cavity 54 in the other two positions of the sleeve. A set of ports 55 is blocked off by the valve chamber wall in the sleeve position of Fig. 1, and also in the lowermost position of the sleeve. These ports however communicate with the cavity 26 in the intermediate sleeve position. A set of ports 56 registers with cavity 26 in one position only of the sleeve valve, namely in its uppermost position. The lowest set of sleeve ports 57 is always in communication with an annular cavity 58 surrounding the valve chamber. The movements of the sleeve valve therefore make and break communication between the interior of the sleeve and the cavity 54, and communication between the cavity 26 and the interior of the sleeve is set up through ports 55 with the sleeve in its intermediate position only and through ports 56 with the sleeve in its uppermost position only. In other words the movements of the sleeve affect the functioning of cavities 54 and 26 only.

A pin 60 extends through stem 44 and is movable relatively within opposed slots 61 of a loose collar 62 surrounding the stem, this pin and collar being accommodated by a socket 63 in end plate 46. The upper end of collar 62 engages a spring 64 which surrounds stem 44. The upper end of this spring contacts a washer 65 that is adapted to abut against a shoulder formed between the chamber 38 and a somewhat larger chamber 66 therebelow. The parts 62 and 65 and the spring 64 tend to maintain the sleeve in its intermediate position illustrated in Fig. 9, and to return it to that position whenever it is relieved of force applied to stem 44 for shifting it up or down. The downward motion of the sleeve under the influence of spring 64 is limited by the engagement of the lower end of collar 62 with the bottom of the socket 63. Motion of the sleeve and its stem may continue downward however, as indicated in Fig. 11, the washer 65 then moving downward and compressing spring 64, and the pin 60 descending below the upper end of slots 61.

When the operation of ram 22 is interrupted it normally comes to rest in its uppermost position, as illustrated in Fig. 1. As it approaches the upper end of its travel an arm 68 secured to the ram and having a bifurcated outer end which straddles the shipper rod 48, engages beneath the collar 69 on that rod and lifts it together with stem 44 and sleeve 40, against the action of spring 64, to the uppermost regular position of the sleeve illustrated in Fig. 1. Fig. 1 therefore illustrates the condition of the sleeve when the system is idle.

The shuttle 41 is of small mass and is capable of rapid action in the operation of the valve. In general it is a hollow spool with three annular lands finished to hold fluid pressure while permitting free reciprocating movement of the shuttle within the sleeve. The upper end of the shuttle is formed by machining or otherwise to provide an annular open ended groove 70 which, in one position of the shuttle, connects ports 50 and 51. An annular groove 71 of relatively great length is adapted to connect the ports 52 and 55, or alternatively to connect ports 51 and 52. In other words, groove 71 controls the flow of incoming live fluid either to annular cavity 26 or to annular cavity 25. It has a further function also of carrying incoming live fluid to annular cavity 54 through ports 53 when the sleeve 40 is in the proper position. A third annular groove 72 provides an annular passage communicating with a set of ports 73 through the wall of the shuttle, and a bottom groove 74 functions when the shuttle is in its lower position to facilitate flow of pressure fluid from ports 57 to the space below the shuttle. The lower end of the shuttle is grooved, as indicated at 77 so that whenever pressure fluid enters the annular cavity 58 it will be effective against the lower end of the shuttle.

Figure 5:
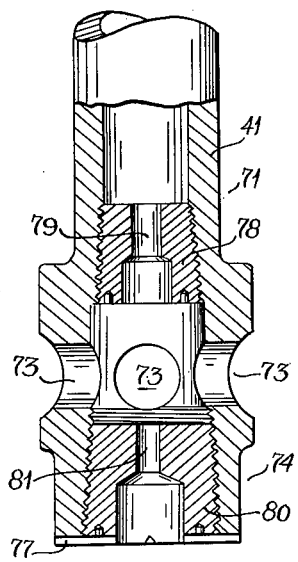
Fig. 5 is a fragmental sectional view of the lower part of the shuttle valve, and Figs. 6 to 17 inclusive are vertical sectional views of the valve mechanism under different operating conditions.

As illustrated more particularly in Fig. 5 a special pipe plug 78 with a constricted passage 79 therethrough is removably mounted in the shuttle above the ports 73, and another somewhat larger plug 80 with a constricted passage 81 therethrough is removably mounted in the shuttle below the ports 73. A series of plugs 78 and 80 with different sized passages may be provided, and those selected for installation which will give the flow characteristics desired for any particular job to be done.

Figures 6, 7, 8, 9:
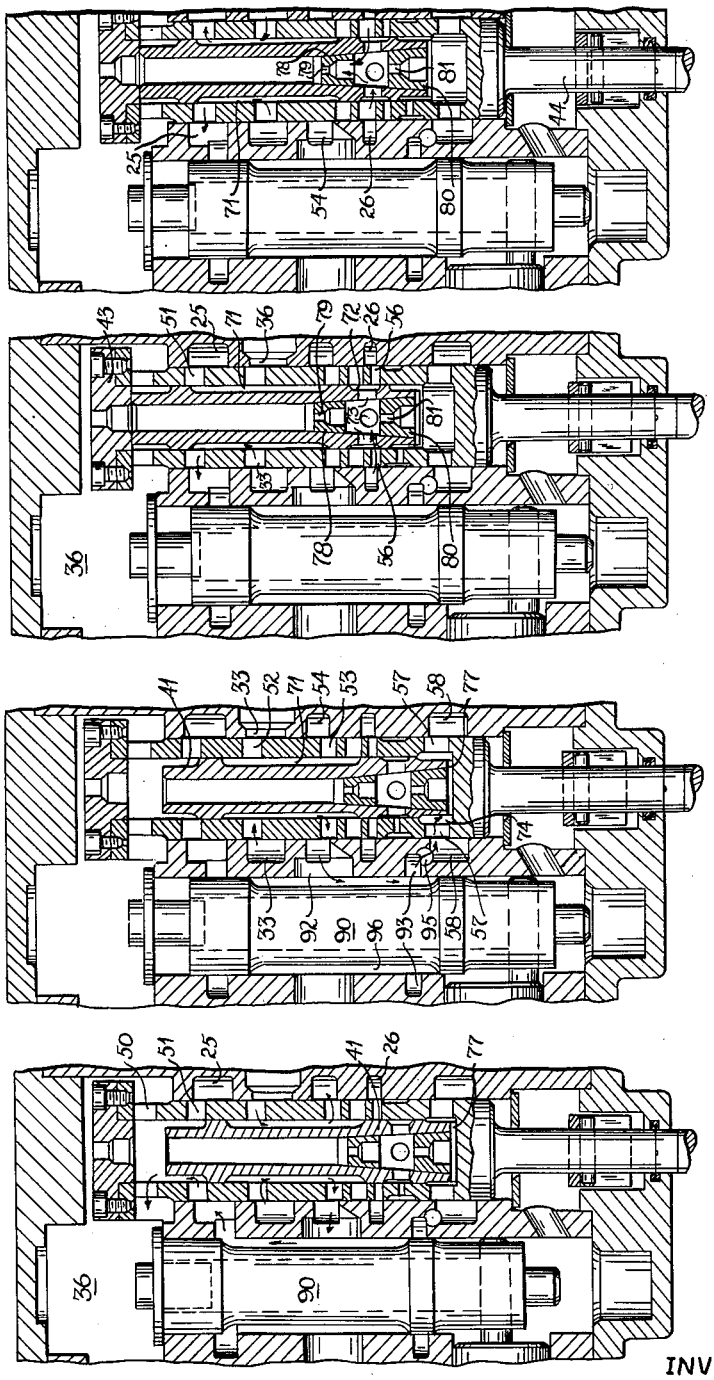

Shuttle 41 is biased towards its down position in engagement with the bottom end wall 42 of the sleeve by means of a coil spring 82, the lower end of which engages plug 78 and the upper end of which is received in a shallow recess 83 in the cap 43 at the upper end of the sleeve. A central passage 84 extends through the cap in communication with recess 83 to furnish a connection for exhausting fluid from the interior of the shuttle into the compartment 36. When strong fluid pressure is exerted against the bottom of the shuttle it rises in opposition to the action of spring 82 until stopped by its engagement with the cap 43, as indicated in Fig. 8.

The manual valve in the illustrated embodiment of the invention comprises a spool 90 that is reciprocable in the valve chamber 39. This chamber communicates with surrounding annular cavities 91 and 93, and a pocket 92, and at the bottom it communicates by means of a passage 94 with the chamber 66 below valve chamber 38. Cavity 91 intersects and is therefore in communication with cavity 25, while pocket 92 intersects and is in communication with cavity 54. Cavity 93 communicates with cavity 58 through a passage 95. Spool 90 has one relatively long annular groove 96 and a lower reduced end 97. An axial extremity 98 at the bottom of the spool serves as a guide for coil spring 99 which extends down into a pocket 100 in the end plate 46 of the housing. Pocket 92 communicates with a bore 18 through the housing which, in the present instance however, is closed by a threaded plug 19.

Figure 2:
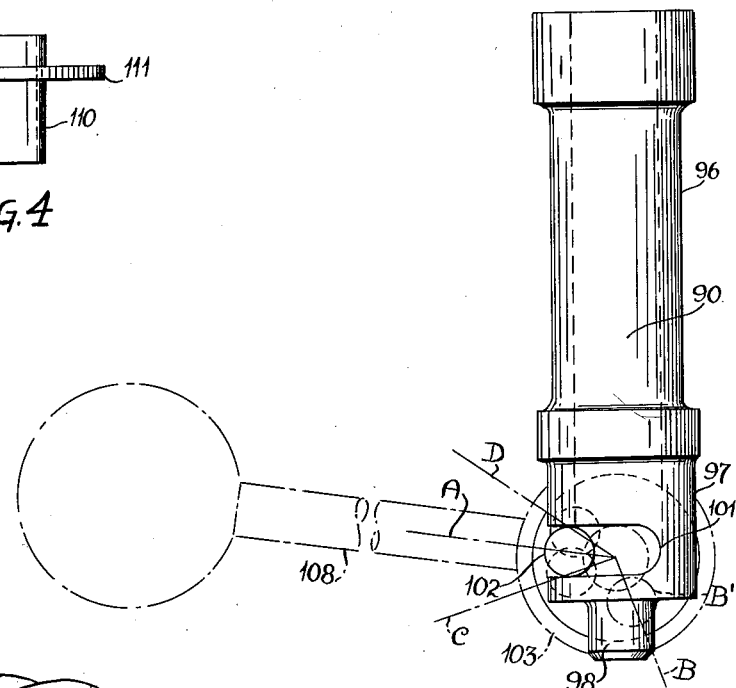
Fig. 2 is an elevational view of the manual valve spool with its operating means, its different operating positions being indicated.

As shown more particularly in Fig. 2, a horizontal slot 101 extends into the spool from one side thereof, being of a height to accommodate a pin 102 which is eccentrically mounted in a cylindrical head 103 that is journaled in a horizontal bore 104 formed in the housing to intersect chamber 39 at right angles. This head 103 is formed on a short rock shaft 105 that extends through a removable plate 106 provided with a seal 107. Shaft 105 is connected with a handle 108 by means of an angular union 109.

As indicated in the drawings spool 90 is hollow except at its lower extremity, and the internal passage through the spool is in communication with the slot 101 which in turn is in free communication with the chamber 39 surrounding the reduced lower end 97 of the spool. In the upper end of the spool there is slidably mounted a short tubular element 110 provided intermediate its ends with a flange 111 which is of a diameter somewhat greater than the diameter of the spool, so that it is adapted to engage a flat surface 112 of the housing in compartment 36. A coil spring 113 engaging flange 111 and fitted into a shallow socket in end plate 37 tends to hold the element 110 and consequently the spool 90 in the position illustrated in Fig. 1. Spring 113 is stronger than spring 99, and hence when no outside force is exerted on spool 90 it takes the position shown in Fig. 1.

Spool 90 may be moved either up or down from the position of Fig. 1 however by manipulation of the handle 108. The position of repose, under the influence of the springs 99 and 113, is illustrated in Fig. 2 in full lines, where it is marked A. When the handle is swung down to the position indicated at B, against the action of spring 99, and the operator's grip upon the handle is released, it will remain in that position, because of the pin 102 being in the over center position marked B'. The spring 99 will hold the handle in this position until it is moved back clockwise past center by the operator. There are two other principal working positions C and D, one below and the other above the position of repose A. When the handle is thrown to either of the latter positions and released, it will return immediately to position A through the action of that one of the springs 99 and 113 which was compressed by the operator's movement of the handle 108. The position of spool 90, shown in Fig. 9, corresponding to handle position B, is the position for effecting continuous ram operation. Position C is employed for the purpose of holding the ram down in pressure contact with the work for such length of time as the operator may desire, and position D is a position for emergency return of the ram to the top of its stroke from any point in its travel. I will now describe the operation to effect the different results named, first with respect to continuous operation of the ram.

*Continuous operation.*—In the operation of my valve mechanism as applied to hydraulic rams, reversal of the ram at the bottom of its stroke may be accomplished in either of two different ways. That is to say, the valve mechanism may be tripped to bring about reversal either by the building up of a predetermined pressure upon contact of the ram with the work, or it may be tripped mechanically when a predetermined length of stroke has been attained.

Reversal by the attainment of a predetermined pressure resulting from resistance of the work to further travel of the ram is illustrated in Figs. 7 to 10 inclusive. The positions of the valve in Fig. 6 correspond to those in Fig. 1, being the position occupied when the system is in readiness for ram operation, the handle of the manual valve being at A in Fig. 2. At this time the annular cavity 26 which is in communication by means of conductor 24 with the space below the ram piston 21, is blocked off by the shuttle, and annular cavity 25 which is in communication by means of conductor 23 with the space above the ram piston, is connected through sleeve ports 51 and 50 with the compartment 36 at the top of the housing, the latter compartment being in communication with exhaust conductor 35 leading back to the tank 31. For continuous operation the operator swings the handle down past center to position B, moving the spool 90 to the position of Fig. 7. Incoming pressure fluid then flows from annular cavity 33 through ports 52, annular groove 71 in shuttle 41 and ports 53 in the sleeve, into annular cavity 54 which is in communication with pocket 92, and thence through annular groove 96 in spool 90, annular cavity 93 and passage 95 into annular cavity 58 surrounding valve chamber 38. Thence it flows through ports 57 in the sleeve and grooves 74 and 77 in the shuttle into the space below the shuttle, overcoming spring 82 and causing the shuttle to rise immediately to its up position illustrated in Fig. 8. Some pressure fluid is of course expended through the constrictions 81 and 79, the bore of the shuttle and the central passage 84 through the cap 43 of the sleeve into the compartment 36 at the top of the housing and out through the conductor 35 to the tank, but the amount of this expended fluid is insufficient to prevent the instantaneous upward movement of the shuttle.

*This upward movement of the shuttle does two things.*—It connects to exhaust, ports 56 which are in communication with annular cavity 26 that is connected with the bottom port of the ram cylinder, and connects annular cavity 25 and conductor 23 leading to the upper end of the ram cylinder with the incoming pressure fluid from pump 30. Exhaust from below the ram piston flows through sleeve ports 56, annular groove 72 in the shuttle and ports 73 therethrough into the space between plugs 78 and 80. From this space it is free to pass through the constriction 79 and the central passage 84 in cap 43 out to exhaust, as previously described. Live fluid from the pump flows from annular cavity 33 through sleeve ports 52, shuttle groove 71 and sleeve ports 51 into annular cavity 25 which is in communication with the upper end of the ram cylinder.

*The ram now starts down.*—When it has traveled a very short distance the upward pressure of arm 68 upon collar 69 on the shipper rod is relieved and the spring 64 is free to act upon collar 62 and pin 60 to move the stem 44 and the shipper rod 48 down to the position of Fig. 9. Sleeve 40 then blocks annular cavity 54 so that there is no longer a connection for transmitting live fluid to the space beneath the shuttle. The shuttle is held up against the action of its spring however by back pressure from the ram cylinder as the piston 21 descends and forces exhaust fluid to the annular cavity 26 and thence through shuttle ports 73 into the space between plugs 78 and 80. The restriction 79 does not permit free flow to exhaust and hence pressure is maintained through constriction 81 in the space beneath the shuttle, which pressure is too great for the spring 82 to overcome. The shuttle is therefore held up throughout the downward travel of the ram. When the latter engages the work the resistance set up by the work to further ram travel causes the pump to build up pressure above the ram piston. When a pressure predetermined by the setting of the relief valve 34 is reached, that valve "spills" fluid back to the tank and the ram movement stops. Exhaust flow into the space in the shuttle between the plugs 78 and 80 then also ceases and the accumulated pressure therein and beneath shuttle 41 is quickly dissipated through ports 79 and 81 permitting the shuttle spring 82 to depress the shuttle to the position of Fig. 10. This shuttle movement reverses the flow of fluid in both of the conductors 23 and 24, causing the ram to rise. Live fluid flow at this time may be traced as follows: from the pump to annular cavity 33, through sleeve ports 52, into shuttle groove 71, through sleeve ports 55 into annular cavity 26 and thence to the space below the ram piston. Exhaust flows from the space above the ram piston through conductor 23, annular cavity 25, sleeve ports 51 to the interior of the sleeve and out through sleeve ports 50 into the compartment 36 and exhaust conductor 35.

The up stroke continues until arm 68 engages collar 69 on the shipper rod and lifts the sleeve valve from the position of Fig 10 to that of Fig. 7, whereupon live pressure fluid is again introduced momentarily into the space beneath the shuttle, and the cycle repeats. The operation is continuous as long as the handle 108 is permitted to remain at position B.

Under a system of this kind the work operated upon by the press may vary in height, and thus a number of different jobs may be performed without changes in the set-up of the machine, for the reversal of the ram from down-stroke to up-stroke is dependent only upon engagement of the ram with the work in the manner and to the extent above described. The pressure to be exerted upon the work is regulated of course by the setting of the relief valve.

Where it is desirable that a uniform length of stroke be maintained in continuous operation, whether or not the resistance of the work is the same on each stroke, the relief valve is given a setting for the maximum pressure which may be required, and a collar 115 is fixed to shipper rod 48 by set screw 116 so as to be engaged by arm 68 when the ram descends to the predetermined desired level. When this point is reached on the down stroke, the shipper rod 48 and the stem 44 are pulled down from the intermediate position, determined by the spring 64 acting upon the collar 62 and the washer 65, to the position of Fig. 11. Sleeve 40 is thereby moved down far enough to exhaust pressure fluid from annular cavity 25 through the space 117 surrounding the reduced upper end of sleeve 40 into the compartment 36. Pressure is thereby relieved on the upper side of the ram piston. The downward movement of sleeve 40 also results in so decreasing the flow from cavity 26, as indicated in Fig. 11, that the shuttle will instantly drop under the influence of spring 82 to the position of Fig. 12 and direct the flow of pressure fluid to the lower end of the power cylinder. This feature of operation is very desirable since inertia together with the weight of the ram and any tools attached thereto might be sufficient otherwise to cause the downward movement of the ram to continue even though the upper end of the power cylinder is vented to exhaust through space 117. The upper end of the ram cylinder is then connected through conductor 23, annular cavity 25, sleeve ports 51 and 50 and compartment 36 with exhaust conductor 35, and live fluid is fed to annular cavity 26 and conductor 24 from annular cavity 33 through sleeve ports 52, shuttle groove 71 and sleeve ports 55 to annular cavity 26 with which the lower end of the ram cylinder is connected through conductor 24. As soon as the ram rises a short distance, spring 64 returns the sleeve to the intermediate position illustrated in Fig. 10, the only effect of which is to open freer communication between ports 55 and annular cavity 26. Upward travel of the ram continues until the arm 68 again lifts the sleeve valve to the position of Fig. 7, resulting in a momentary flow of live fluid to the bottom of the shuttle by the means previously described with respect to that figure, the shifting of the shuttle to the top of its throw and the reversal of flow of live and exhaust fluid to and from the cylinder.

When the ram is to be stopped after a period of continuous operation, the operator merely swings the handle 108 clockwise as viewed in Fig. 2 until it gets beyond dead center, when it may be released and permitted to move to the A position. Thereupon the annular cavity 93 will be blocked off by the spool 90, and when the ram reaches the top of its stroke there will be no force to raise the shuttle and reverse the flow of power fluid. Hence the movement of the ram will cease.

At such times there may be a slight leakage of pressure fluid into the annular cavity 26 connected with the lower end of the ram cylinder, which leakage may cause the ram to rise beyond its normal uppermost position. In such case the sleeve 40 will be raised a like amount by arm 68 to a position somewhat like that illustrated in Fig. 13. In this position pressure fluid will be bled out of the cavity 26 through the groove 75 in the sleeve and the port 76 into the groove 72 of the shuttle and from there through shuttle ports 73 and constricted passage 79 into the bore of the shuttle and thence to exhaust.

*Single cycling.*—For many purposes it is desirable to have the ram make a single reciprocation down and up after each manipulation of the handle 108 by the operator, and this is true whether the reversal at the bottom of the stroke be accomplished by resistance of the work or by the measured travel of the ram. Starting with the idle position of Figs. 1 and 2, the operator depresses the handle far enough to move the spool 90 from the position of Fig. 1 to approximately that of Fig. 14; in other words, far enough to bring groove 96 into communication with annular cavity 93. The shuttle 40 being down at this time, as in Fig. 1, incoming live fluid will pass from annular cavity 33 through ports 52 into shuttle groove 71 and through ports 53, annular cavity 54 and pocket 92 to spool groove 96 and thence (Fig. 14) to annular cavity 93, passage 95, annular cavity 58 and sleeve ports 57 to the space below the shuttle. The operator may release his hold upon the handle 108 almost immediately, for the shuttle will rise at once to its upper position. Then live fluid will flow to the upper end of the ram cylinder and the lower end of that cylinder will be open to exhaust in the same manner as previously described with reference to Fig. 9, that is to say the live fluid will take the course of the upper arrows in Fig. 9 into annular cavity 25 which is connected with the upper end of the cylinder, and the exhaust from the lower end of the cylinder, connected with cavity 26, will flow from that cavity by way of the lower arrows into the bore of the shuttle and thence to compartment 36 and exhaust conductor 35. Exhaust fluid will also flow through the constriction 81 to the space beneath the shuttle to maintain the latter in its raised position. The ram will then start down, and after moving a very short distance will cause the sleeve to descend to the position of Fig. 9, which will cut off flow of live fluid from groove 71 to annular cavity 54, and hence to the space below the shuttle. At the bottom of the ram stroke the shuttle will descend under the influence of spring 82, as previously described, and the direction of live and exhaust fluid flow will be reversed causing the ram to rise. When it reaches the top of its stroke the cavity 93 being blocked off by the spool 90 as in Fig. 1, there will be no force to lift the shuttle and the space above the ram piston will remain connected with exhaust. Hence the ram will stop and will remain at the top of its stroke until the handle 108 is again moved from its A position by the operator.

When the ram is in repose at the top of its stroke the pump volume is by-passed to the tank, as indicated by the arrows in Fig. 6, with a minimum of restriction, thereby relieving the pump of any substantial load.

Figure 15:
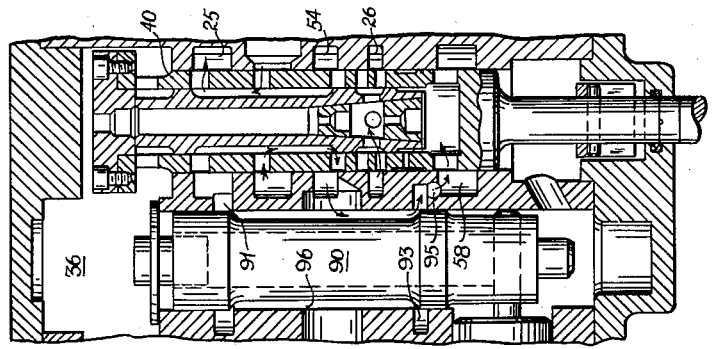
Figure 16:
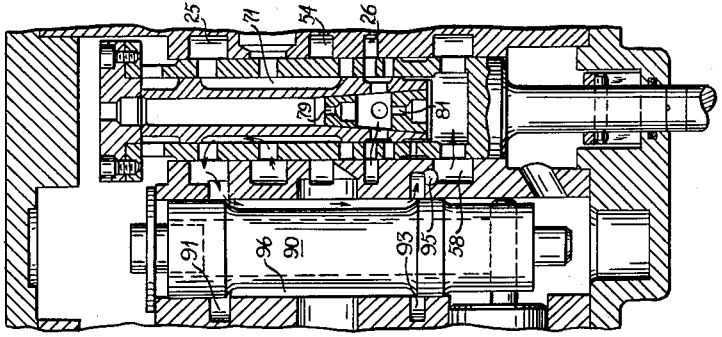
Figure 14:
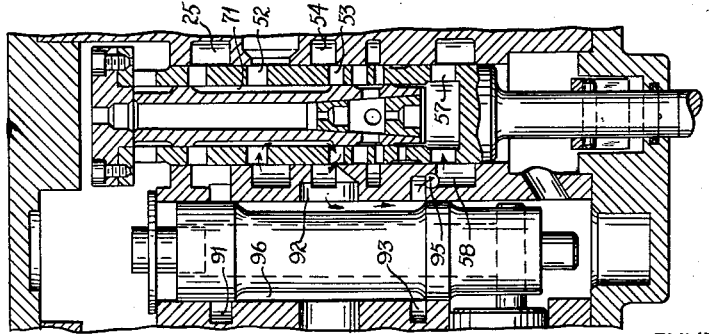

*Holding ram against work.*—When the operator desires to have the ram descend to exert pressure against the work and continue to do so for such length of time as he may elect, he swings the handle 108 toward position B far enough to cause the manual control spool 90 to cover the annular cavity 91 and uncover the annular cavity 93 as in Fig. 14, in order to introduce a charge of live fluid momentarily into the space beneath the shuttle and cause the shuttle to rise and make connections for the down stroke of the ram. He then backs off the handle 108 to position C and holds it there. In this position the spool 90 stands as shown in Fig. 15, where the cavities 91 and 93 are connected by the groove 96 in the spool. Very soon after the ram starts down the sleeve 40 descends from the position of Fig. 15 to that of Fig. 16, thereby cutting off the flow of live fluid to the cavity 54 and thence to the cavity 93, but in the meantime the shuttle has risen and live fluid is flowing to the cavity 25 and thence to the space above the ram piston, and also from cavity 25 through cavity 91, spool groove 96, cavity 93, passage 95 and cavity 58 to the space below the shuttle. When the ram strikes the work, the back pressure into cavity 26 is no longer effective, but the pressure fluid from the cavity 25 flowing through the chamber of the manual valve as just described holds the shuttle up and prevents the reversal of flow to and from the cylinder. Hence the ram remains in contact with the work until the handle 108 is released. The pressure below the shuttle is then relieved through the constrictions 81 and 79 and the shuttle descends, causing reversal of fluid flow and travel of the ram to its uppermost position. A further function for this position C of the control valve is that it enables the operator to set the relief valve to a desired gauge pressure, it being impractical to attempt to read the gauge when maximum pressure is exerted momentarily only. A pressure gauge is indicated in Fig. 1 at 120, with an on and off valve at 121.

Figure 17:
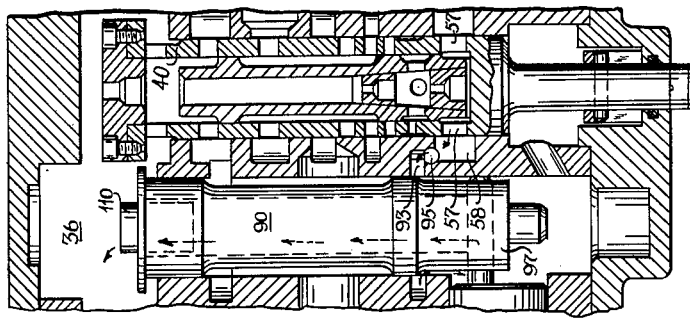

*Emergency action.*—Fig. 17 illustrates a position of the manual control spool 90 corresponding to handle position D of Fig. 2. This is the position to which the operator throws the handle when for any reason he wishes to terminate the downward travel of the ram abruptly, that is before it completes its down stroke. It will be remembered that the shuttle must be in its up position in order to direct live fluid to the top of the ram cylinder and exhaust fluid from the bottom of the ram cylinder. In the Fig. 17 position the pressure beneath the shuttle is dissipated through sleeve valve ports 57, annular cavity 58, passage 95, annular cavity 93, and the space surrounding the reduced lower end of the spool into the slot 101 of the spool and thence upwardly through the longitudinal passage in the spool and the tubular element 110 to compartment 36 and exhaust conductor 35. As soon as this occurs the shuttle of course descends under the influence of its spring 82 and the travel of the ram is reversed. When the ram starts upward the operator releases his hold on the handle 108 and the spool resumes its position corresponding to position A of Fig. 2, thereby blocking off the annular cavity 93. Hence, when the ram reaches the top of its stroke its operation is terminated until the operator again pulls handle 108 downward. This emergency D position of the manual control is equally useful whether the valve mechanism is set for single cycling or continuous operation.

Having thus described my invention, I claim:

1. In mechanism of the character described, a source of fluid pressure, a power cylinder, a sleeve valve, a shuttle valve slidable endwise within said sleeve valve for controlling the flow of pressure fluid from said source to each of the opposite ends of said cylinder alternatively and from the remaining end to exhaust, a spring tending to move said shuttle valve in one direction, means responsive to the movement of said sleeve valve and with it said shuttle valve in one direction for utilizing momentarily pressure from said source to shift said shuttle valve against the action of said spring and thereafter for utilizing back pressure from said cylinder to maintain said shuttle valve in its shifted position, said shuttle valve having a constricted passage axially thereof through which said back pressure is dissipated.

2. In mechanism of the character described, a source of fluid pressure, a power cylinder, a sleeve valve, a shuttle valve slidable endwise within said sleeve valve for controlling the flow of pressure fluid from said source to each of the opposite ends of said cylinder alternatively and from the remaining end to exhaust, a spring tending to move said shuttle valve in one direction, means responsive to the movement of said sleeve valve and with it said shuttle valve in one direction for utilizing momentarily pressure from said source to shift said shuttle valve against the action of said spring and thereafter for utilizing back pressure from said cylinder to maintain said shuttle valve in its shifted position, said shuttle valve having an axial passage therethrough for exhausting said back pressure, and a removable plug with a constricted opening therethrough mounted in said passage.

3. In mechanism of the character described, a valve housing having two cylindrical valve chambers, automatic valve means in the first chamber comprising a shuttle movable in one direction by pressure fluid for reversing live and exhaust fluid flow to and from a power cylinder, said automatic valve comprising also a sleeve interposed between said shuttle and the cylindrical wall of said first chamber, the path of flow for pressure fluid to move said shuttle passing through said first chamber and then through the second chamber, and a manual valve in the second chamber, said sleeve valve and said manual valve controlling said path of flow.

4. In mechanism of the character described, a power cylinder, a piston therein, a valve housing having two valve chambers, the first said chamber being cylindrical, automatic valve means in said first chamber comprising a shuttle movable in one direction by pressure fluid for reversing live and exhaust fluid flow to and from said power cylinder, said automatic valve comprising also a sleeve interposed between said shuttle and the cylindrical walls of said first chamber, the path of flow of said pressure fluid to move said shuttle passing through said first chamber and then through the second chamber, means for moving said sleeve valve once for each cycle of the power cylinder piston to open said path of flow through said first chamber, and a manual valve in said second chamber for controlling the said path through that chamber.

5. In mechanism of the character described, a power cylinder, a piston therein, a housing having a valve chamber therein, automatic valve means in said chamber for reversing live and exhaust fluid flow to and from the ends of said power cylinder, comprising a shuttle movable in one direction by pressure fluid and in the other by spring pressure, manual means for momentarily instituting pressure fluid flow to shift said shuttle against the action of said spring pressure, and means under control of said automatic valve means for utilizing back pressure from said power cylinder for maintaining said shuttle in the said shifted position, and thereby causing the piston of said power cylinder to continue its motion in a given direction until said back pressure is relieved.

6. In mechanism of the character described, a power cylinder, a piston therein, automatic valve means for reversing live and exhaust fluid flow to and from the ends of said power cylinder, comprising a hollow shuttle valve disposed for movement in an elongated chamber having one closed end, a spring tending to move the shuttle toward said closed end, said shuttle having an internal constriction and being adapted to be held away from said closed end against the action of said spring by exhaust fluid from the power cylinder flowing through said constriction, and manual means for exhausting fluid from the closed end of said chamber.

7. In mechanism of the character described, a power cylinder, a piston therein, automatic valve means for controlling the flow of pressure fluid to the opposite ends of said power cylinder alternatively, said means comprising a shuttle operating by pressure fluid against spring pressure and a sleeve surrounding said shuttle, said sleeve being biased downwardly and adapted to be lifted to a top position by the power piston at the end of its return stroke, manual means effective only while said sleeve is in top position for causing momentary flow of pressure fluid to shift said shuttle to position for causing the piston of the power cylinder to move on its power stroke, said manual means being adapted also when shifted to a given different position while said sleeve is lowered to utilize live pressure in the power cylinder for maintaining the shuttle shifted against the action of the spring and thereby holding the piston in work performing position at the will of the operator.

8. In a hydraulic system, a source of fluid pressure; a reversible fluid motor; means for controlling the operation of said motor comprising a flow-directing element movable between one position to direct fluid from said source to said motor to cause forward operation thereof and a second position to direct fluid to said motor to cause reverse operation; manually operated means for momentarily applying fluid from said source to said element to move the same to said first position to initiate forward operation of said motor; and means for restricting the exhaust flow of fluid from said motor during forward operation thereof to create a fluid back pressure, said flow-directing element being retained in said first position by such back pressure.

9. In a hydraulic system, a source of fluid pressure; a fluid motor; means for controlling the flow of fluid from said pressure source to and from said motor to effect forward and reverse operation thereof, comprising a flow-directing element disposed for movement between two positions, said element serving when in one of said positions to direct fluid from said source to said motor to cause forward operation thereof and to cause reverse operation of said motor when in the other of said positions; means tending to urge said flow-directing element toward the latter position; means comprising a valve means for momentarily directing fluid from said pressure source against said element to move the same in opposition to said urging means to the first position to initiate forward operation of said motor; means for partially resisting exhaust flow from said motor during forward operation thereof to create a fluid back pressure, said flow directing element being retained in said first position by such back pressure and movable to said second position by said urging means upon diminution of said back pressure to effect reverse operation of said motor; and means comprising said valve means functioning in response to forward operation of said motor for diminishing the back pressure whereby said flow-directing element will be moved to said second position to reverse the direction of operation of said motor.

10. In a hydraulic system, a source of fluid pressure; a reversible fluid motor; means for controlling the flow of fluid from said pressure source to and from said motor to effect forward and reverse operation thereof comprising, a flow-directing element supported for movement between two positions in one of which said element directs fluid from said source to said motor to cause forward operation thereof and in the other of which said element directs fluid to cause reverse operation of said motor; means tending to urge said flow-directing element toward the latter position; valve means movable to two extreme positions and a plurality of intermediate positions, said valve means cooperating when in one intermediate position with said flow directing element to by-pass fluid from said pressure source to exhaust, another intermediate position of said valve means serving to apply fluid from said pressure source against said flow-directing element to move the same in opposition to said urging means to the position causing forward operation of said motor; means effective during the forward stroke of the motor for restricting the flow of fluid therefrom to exhaust to create a back pressure, said flow directing element being retained in said first position by such back pressure and movable to said second position by said urging means upon the diminution of said back pressure; means responsive to the forward operation of said motor for diminishing said back pressure, whereby said flow-directing element will move to said second position to reverse the operation of said motor, said valve means when moved to one extreme position serving to diminish said back pressure prior to the operation of said last-mentioned means.

11. In mechanism of the character described, a power cylinder, a piston therein, a slide valve, a shuttle valve for controlling the flow of pressure fluid to each side of the piston of said power cylinder alternately and from the other side thereof to exhaust, means responsive to the movement of said piston on its return stroke for shifting said slide valve in one direction, said shuttle valve being adapted to be moved in one direction by fluid pressure, and a manual valve spring biased to a given intermediate position said slide valve when in said shifted position only passing pressure fluid to said manual valve, and said manual valve being operable in one direction from said intermediate position to direct fluid passed by said shifted slide valve against one end of said shuttle for moving the latter in one direction.

12. In mechanism of the character described, a power cylinder, a casing having a pressure fluid intake port and a control pocket, a sleeve valve adapted when in one longitudinal position only to transmit pressure fluid from said intake port to said pocket, said casing having a passage in communication with said pocket, a shuttle valve within said sleeve valve, said sleeve valve having a chamber in one end thereof to which said shuttle is exposed and with which said passage is connected, said shuttle valve being responsive to the presence or absence of fluid pressure in said chamber for directing the flow of pressure fluid from said intake port alternately to the opposite ends of said power cylinder, and manually operated means in said passage for controlling the flow of fluid therethrough.

13. In mechanism of the character described, a power cylinder, a casing having a pressure fluid intake port and a control pocket, a sleeve valve adapted when in one longitudinal position only to transmit pressure fluid from said intake port to said pocket, said casing having a passage in communication with said pocket, a shuttle valve within said sleeve valve, said sleeve valve having a chamber in one end thereof to which said shuttle is exposed and with which said passage is connected, said shuttle valve being responsive to the presence or absence of fluid pressure in said chamber for directing the flow of pressure fluid from said intake port alternately to the opposite ends of said power cylinder, and manually operated means in said passage for controlling the flow of fluid therethrough, said shuttle valve having a constricted axial passage connected with exhaust.

14. In mechanism of the character described, a power cylinder, a casing having a pressure fluid intake port and a control pocket, a sleeve valve adapted when in one longitudinal position only to transmit pressure fluid from said intake port to said pocket, said casing having a passage in communication with said pocket, a shuttle valve within said sleeve valve, said sleeve valve having a chamber in one end thereof to which said shuttle is exposed and with which said passage is connected, said shuttle valve being responsive to the presence or absence of fluid pressure in said chamber for directing the flow of pressure fluid from said intake port alternately to the opposite ends of said power cylinder, manually operated means in said passage for controlling the flow of fluid therethrough, said shuttle valve having a constricted axial passage connected with exhaust, and means for introducing back pressure from the power cylinder into said chamber on the power stroke.

15. In mechanism of the character described, a power cylinder, a piston therein, a shuttle valve for controlling the flow of pressure fluid to each side of the piston of said power cylinder alternately and from the other side thereof to exhaust, a cylindrical member in which said shuttle valve slides, spring means for biasing said shuttle in one direction, said cylindrical member having a chamber at one end, said shuttle valve having a constricted axial passage connected with exhaust, a manual valve movable to one position for bringing said chamber momentarily into communication with pressure fluid for shifting said shuttle valve against the action of said spring, and means for utilizing back pressure from said power cylinder for maintaining the shuttle in said shifted position throughout its power stroke, said manual valve being movable to another position for making unrestricted connection between said chamber and exhaust.

16. In mechanism of the character described, a power cylinder, a piston therein, a casing having a pressure fluid intake port and a control pocket, a sleeve valve adapted when in one longitudinal position only to transmit pressure fluid from said intake port to said pocket, a shuttle valve within said sleeve for controlling the flow of pressure fluid to each side of the piston of said power cylinder alternately and from the other side thereof to exhaust, said sleeve having a chamber at one end, a manual valve having a position for connecting said pocket with said chamber, whereby said shuttle valve may be moved to position for directing pressure fluid to the power side of said piston when said sleeve valve is in said stated position, said manual valve having a second position for connecting the power end of said cylinder to said chamber when said sleeve valve is in a different position.

17. In hydraulic apparatus, a power cylinder, a piston therein, means for controlling the flow of fluid under pressure to said power cylinder to effect forward and reverse operation of said piston comprising a shuttle valve, means urging said shuttle valve toward a predetermined position, means for momentarily applying fluid under pressure to said shuttle valve to move the same in opposition to said urging means to a second position wherein fluid will be directed to the power cylinder to cause operation thereof in one direction, means for restricting exhaust flow from the power cylinder during such operation to create back pressure effective against said shuttle valve for maintaining the same in said second position, and means operated by said power cylinder to by-pass fluid under pressure to exhaust to substantially interrupt the operation of said power cylinder whereby the back pressure will be rapidly dissipated, thus permitting said shuttle valve to return to said predetermined position under the influence of said urging means.

18. Valve means for controlling the flow of pressure fluid and exhaust to and from the ends of a power cylinder, comprising a valve mounting having a bore therein, a shuttle valve slidable in said bore, said bore being open at one end to exhaust, spring means for biasing said shuttle toward the opposite end of said bore, said shuttle having an axial passage therethrough open toward the open end of said bore, said mounting having ports spaced longitudinally adapted to be connected with the respective ends of the power cylinder, said shuttle having a radial port adapted when the shuttle is in its said biased position to connect with one of the ports in said mounting for exhausting fluid from one end of the cylinder through said axial passage and the open end of said bore, and said shuttle having a reduced extremity adapted to register with the other port in said mounting for exhausting fluid from the other end of the power cylinder through the open end of said bore.

19. In a hydraulic system, a source of fluid pressure, a fluid motor, means for controlling the flow of fluid from said pressure source to and from said motor to effect forward and reverse operation thereof, comprising a flow directing element disposed for movement between two positions, said element serving when in one of said positions to direct fluid from said source to said motor to cause forward operation thereof and to cause reverse operation of said motor when in the other of said positions, means tending to urge said flow-directing element toward the latter position, means for momentarily directing fluid from said pressure source against said element to move the same in opposition to said urging means to the first position to initiate forward operation of said motor, and means for partially resisting exhaust flow from said motor during forward operation thereof to create a fluid back pressure, said flow directing element being retained in said first position by such back pressure and movable to said second position by said urging means upon diminution of said back pressure to effect reverse operation of said motor.

20. In mechanism of the character described, a source of fluid pressure, a reversible fluid motor, a control valve mechanism between said pressure source and said motor, said mechanism comprising a shuttle valve biased toward a position to cause operation of said motor in one direction and movable by the application of fluid pressure to a second position for causing reverse operation of said motor, and means for controlling the operation of said shuttle valve, said means having a valve element yieldably retained in a predetermined position and an eccentric device operative to move said element to positions on either side of said predetermined position to alternately effect the application of fluid pressure to said shuttle valve and the exposure thereof to exhaust, said eccentric serving also to selectively lock said element in at least one of said positions.

21. In mechanism of the character described, a source of fluid pressure, a reversible fluid motor having a cylinder and piston, valve mechanism for controlling the flow of live and exhaust fluid to and from the opposite ends of said cylinder, said mechanism comprising a shuttle valve biased toward one extreme position and movable to the opposite extreme position by pressure fluid in a chamber to which an end of the shuttle valve is exposed, and means for controlling the pressure condition in said chamber comprising a manual valve element movable in opposite directions from a given intermediate position, a manual control member operative to move said element to positions on either side of said intermediate position, and yieldable means tending to return said valve element to said intermediate position, said valve element when shifted to one side of said intermediate position functioning to permit the introduction of fluid pressure to said chamber and when shifted to the opposite side of said intermediate position to expose said chamber to exhaust, said manual control member being adapted to be thrown in one direction over center relative to said yieldable means for holding said valve element in one of its shifted positions.

22. Mechanism as defined in claim 21, characterized in that said manual control member comprises a cylindrical head with a pin projecting eccentrically therefrom, said valve element having a slot therein transverse to the direction of movement of the valve element and receiving said pin, said yieldable means tending to hold said pin in an intermediate position in horizontal alignment with the axis of said head, and a handle for turning said head to move the pin upwardly or downwardly from said intermediate position, and in one direction more than a quarter revolution from said intermediate position, whereby said yieldable means tends to hold said pin in an over center position for retaining said valve element in a shifted position.

23. Mechanism as defined in claim 21, comprising valve means actuated by said piston for controlling the admission of pressure fluid to said chamber when said manual valve element is disposed to permit the introduction of fluid pressure to said chamber.

CECIL E. ADAMS.

REFERENCES CITED

The following references are of record in the file of this patent:

UNITED STATES PATENTS

| Number | Name | Date |
|---|---|---|
| 679,533 | Moore | July 30, 1901 |
| 751,319 | Maurer | Feb. 2, 1904 |
| 1,690,069 | Ferris | Oct. 30, 1928 |
| 1,931,452 | Wheeler | Oct. 17, 1933 |
| 2,169,470 | Miller | Aug. 15, 1939 |
| 2,200,998 | Schnuck | May 14, 1940 |
| 2,212,871 | Wood | Aug. 27, 1940 |
| 2,316,471 | Tucker | Apr. 13, 1943 |
| 2,335,809 | Stacy | Nov. 30, 1943 |
| 2,376,671 | Dodson | May 22, 1945 |
| 2,389,661 | Fischer | Nov. 27, 1945 |